United States Patent
Gopalakrishnan et al.

(10) Patent No.: US 11,356,006 B2
(45) Date of Patent: Jun. 7, 2022

(54) ELECTRIC MACHINE WITH INDUCTIVE POSITION SENSOR ASSEMBLY AND METHOD FOR ASSEMBLING AND ALIGNING THE SAME

(71) Applicant: GM GLOBAL TECHNOLOGY OPERATIONS LLC, Detroit, MI (US)

(72) Inventors: Suresh Gopalakrishnan, Troy, MI (US); Chandra S. Namuduri, Troy, MI (US); Alexandru Rajala, Farmington Hills, MI (US); Thomas W. Nehl, Shelby Township, MI (US); Xiaohui Du, West Bloomfield, MI (US); Edward L. Kaiser, Pontiac, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 365 days.

(21) Appl. No.: 16/774,696

(22) Filed: Jan. 28, 2020

(65) Prior Publication Data
US 2021/0234447 A1    Jul. 29, 2021

(51) Int. Cl.
*H02K 24/00* (2006.01)
*H02K 7/00* (2006.01)
(Continued)

(52) U.S. Cl.
CPC .............. *H02K 24/00* (2013.01); *B60L 50/66* (2019.02); *B60L 53/22* (2019.02); *H02K 7/006* (2013.01);
(Continued)

(58) Field of Classification Search
CPC .............. A01G 2025/003; A01G 22/00; A01G 25/023; A01G 25/06; A01G 25/167; A01G 24/10; B60L 2210/10; B60L 50/66; B60L 53/22; H02K 11/225; H02K 24/00; H02K 7/006; Y02T 10/64; Y02T 10/70; Y02T 10/7072; Y02T 90/14
See application file for complete search history.

(56) References Cited

U.S. PATENT DOCUMENTS 5,529,114 A * 6/1996 Hall ..................... B60L 1/003
165/41
10,408,184 B1 * 9/2019 Namuduri ........... F02N 11/0844
(Continued)

FOREIGN PATENT DOCUMENTS

WO    WO-2005039036 A2 * 4/2005 ............. A63B 22/02

*Primary Examiner* — Naishadh N Desai
(74) *Attorney, Agent, or Firm* — Quinn IP Law (57) ABSTRACT

An electric machine includes a machine rotor circumscribed by a machine stator, and having a rotor shaft, rotor stack, and end cap which rotate about an axis. The end cap includes lobes equal in number to a number of pole pairs of the machine rotor. A position sensor assembly has a predetermined alignment with the machine rotor and stator. The sensor assembly includes a sensor rotor formed by the lobes and a sensor stator having a printed circuit board with conductive sine and cosine traces. Machine rotor rotation causes the sensor assembly to output an unmodulated sine and cosine signals to a controller, which then calculates a calibrated reference angle. A magnetic axis of an electrical phase of the machine is aligned with and bisects a peak of the sine trace. A direct axis of the machine rotor aligns with an edge of a lobe.

20 Claims, 3 Drawing Sheets

(51) Int. Cl.
*B60L 50/60* (2019.01)
*B60L 53/22* (2019.01)
*H02K 11/225* (2016.01)

(52) U.S. Cl.
CPC ........ *H02K 11/225* (2016.01); *B60L 2210/10* (2013.01)

(56) References Cited

U.S. PATENT DOCUMENTS

| | | | | |
|---|---|---|---|---|
| 2016/0185335 | A1* | 6/2016 | Namuduri | B60W 20/30 180/65.265 |
| 2017/0334422 | A1* | 11/2017 | Namuduri | B60K 6/26 |
| 2018/0291859 | A1* | 10/2018 | Namuduri | B60L 58/18 |
| 2019/0326790 | A1* | 10/2019 | Hao | H02K 5/15 |

* cited by examiner

ELECTRIC MACHINE WITH INDUCTIVE POSITION SENSOR ASSEMBLY AND METHOD FOR ASSEMBLING AND ALIGNING THE SAME

INTRODUCTION

The present disclosure relates to a position sensor assembly for use with a rotary electric machine having a stator and a rotor, and to methods for assembling and methods for aligning such a sensor assembly with the stator and rotor. The disclosed approaches enable an associated electronic controller to establish a calibrated reference angle for control of the rotor, with the controller doing so using pure/unmodulated sine and cosine signals provided by the sensor assembly. As such, the sensor may be optionally configured as an inductive-based sensor configured to output such unmodulated sine/cosine signals. The controller is thus able to accurately ascertain the rotor's present angular position and speed. Use of the present sensor assembly is intended to simplify the calibration and real-time control efforts of the electric machine, along with reducing the electric machine's overall structural complexity.

As will be appreciated by those of ordinary skill in the art, electric machines frequently use a resident position sensor connected to the machine's rotor. When stator windings of the electric machine are energized to cause rotation of the rotor, the position sensor outputs sensor data indicative of the rotor's angular position. The sensor data is typically transmitted to a controller, which in turn has requisite logic for processing the position signals and deriving the rotor's angular position and speed. The position and speed are thereafter used by the controller in real time to regulate output torque and speed of the electric machine.

An electric powertrain uses the generated output torque from one or more electric machines to perform work. In a polyphase/alternating current (AC) electric machine, for instance, sequential energizing of the individual stator windings is used to generate a rotating magnetic field with respect to the stator. The rotating stator field interacts with a fixed magnetic field of the machine's rotor, with such stator-rotor field interaction ultimately producing useful machine rotation. Output torque from the machine rotation is thereafter harnessed using gear sets, pulleys, or another suitable torque transfer mechanisms and delivered to a connected load. In an electric or hybrid electric vehicle using an electric powertrain, for instance, output torque from an electric traction motor may be used to power road wheels and thereby propel the vehicle.

SUMMARY

A position sensor assembly is described herein for use as an improved rotary position sensor within an electric powertrain. As noted above, rotary position sensors are used to determine the instantaneous angular position and speed of a machine rotor in an electric machine. A resolver operating in accordance with the principle of reluctance and excitation in the 4-10 kHz range is typically used for this purpose, with a resolver ordinarily constructed from a laminated sensor stator and rotor. As a resolver lacks associated control logic, modulated sine/cosine signals are communicated from the resolver to a controller and/or power inverter for demodulation and subsequent derivation of the instantaneous angular position and speed of the electric machine. The position sensor assembly constructed and aligned as described herein may be used in lieu of such a resolver to help simplify sensor calibration efforts while minimizing overall structural and control complexity, among other attendant benefits.

In certain embodiments, the electric machine may be constructed as a polyphase/AC permanent magnet synchronous motor (PMSM) configured for use as a traction or propulsion motor aboard a motor vehicle or other mobile platform and controlled using an onboard controller, e.g., a motor control processor and associated memory. In such an embodiment, output torque from the PMSM is directed to one or more road wheels. The electric machine may include a cylindrical rotor and stator, with the stator surrounding the rotor in a representative radial flux machine configuration.

The electric machine and disclosed sensor assembly have a corresponding rotor and stator, which for added clarity are referred to hereinafter as the machine rotor, the machine stator, the sensor rotor, or the sensor stator, respectively. The sensor rotor may be integrated with structure of the machine rotor in the manner described herein. The position sensor assembly may be aligned with the machine stator and the machine rotor in manner sufficient for establishing a calibrated reference angle. The calibrated reference angle is thereafter used by the controller to regulate ongoing operation of the electric machine.

In a disclosed embodiment, the rotary electric machine includes a machine rotor that is circumscribed by a machine stator, and having a rotor shaft, a rotor stack, and an annular end cap. The rotor shaft, rotor stack, and end cap are collectively configured to rotate in unison about an axis of rotation. The end cap may include multiple lobes, which extend in a radial and axial direction. The lobes are equal in number to a number of magnetic pole pairs of the machine rotor.

The electric machine in this particular embodiment also includes an inductive position sensor assembly having a predetermined alignment with the machine rotor and the machine stator, respectively. The sensor assembly includes a sensor rotor formed by the lobes, and a sensor stator having a printed circuit board (PCB) with a major surface. Electrically conductive sine and cosine traces, e.g., copper traces, are formed on the major surface of the PCB. The sensor assembly is configured, once properly aligned and excited, and in response to rotation of the machine rotor and resulting rotation of the rotor lobes with respect to the sine and cosine traces, to generate and output unmodulated sine/cosine signals to the controller.

The rotor stack may include permanent magnets arranged in alternating north and south pole orientations around a perimeter of the machine rotor. The electric machine in such an embodiment may be configured as a permanent magnet synchronous motor.

The lobes may be constructed of copper, aluminum, or steel in some embodiments, with the lobes having an axial thickness of at least 0.5 mm.

The rotary electric machine of this or other embodiments may be constructed as a polyphase/alternating current-powered electric traction motor, and the sine and cosine traces have respective peaks and valleys. In the predetermined alignment with the machine stator, a magnetic axis of a predetermined electrical phase of the electric traction motor, e.g., the A-phase in an exemplary ABC/three-phase implementation, is aligned with and bisects a peak of the sine trace.

In the predetermined alignment with the machine rotor, a direct axis (d-axis) of the machine rotor is aligned with an edge of one of the lobes of the sensor rotor.

An electric powertrain is also disclosed herein. An embodiment of the electric powertrain includes a controller, a traction power inverter module (TPIM) connected to a battery pack, and a polyphase rotary electric machine connected to the TPIM. The electric machine is constructed as set forth above, with the rotor in this embodiment being connected to a driven load such as one or more road wheels of a motor vehicle. The sensor stator is in communication with the controller, which in turn is configured to control a torque and/or speed operation of the electric machine using the calibrated reference angle as derived from the unmodulated sine/cosine signals from the sensor assembly.

Also disclosed herein is a method for assembling an inductive position sensor assembly for use with a rotary electric machine. The method may include providing a sensor stator having PCB with electrically conductive sine and cosine traces formed on a major surface of the PCB, and providing an annular end cap having lobes equal in number to a number of pole pairs of the machine rotor. The method may also include connecting the sensor stator to the machine stator with a predetermined stator-stator alignment, and connecting the annular end cap to the machine rotor with a predetermined rotor-rotor alignment. In response to rotation of the machine rotor and a resulting rotation of the lobes with respect to the sine and cosine traces, the method includes generating and outputting an unmodulated sine/cosine data pair to the controller for control of the electric machine.

The above summary is not intended to represent every embodiment or aspect of the present disclosure. Rather, the foregoing summary exemplifies certain novel aspects and features as set forth herein. The above noted and other features and advantages of the present disclosure will be readily apparent from the following detailed description of representative embodiments and modes for carrying out the present disclosure when taken in connection with the accompanying drawings and the appended claims.

The present disclosure is susceptible to modifications and alternative forms, with representative embodiments shown by way of example in the drawings and described in detail below. Inventive aspects of this disclosure are not limited to the particular forms disclosed. Rather, the present disclosure is intended to cover modifications, equivalents, combinations, and alternatives falling within the scope of the disclosure as defined by the appended claims.

DETAILED DESCRIPTION

Figure 1:
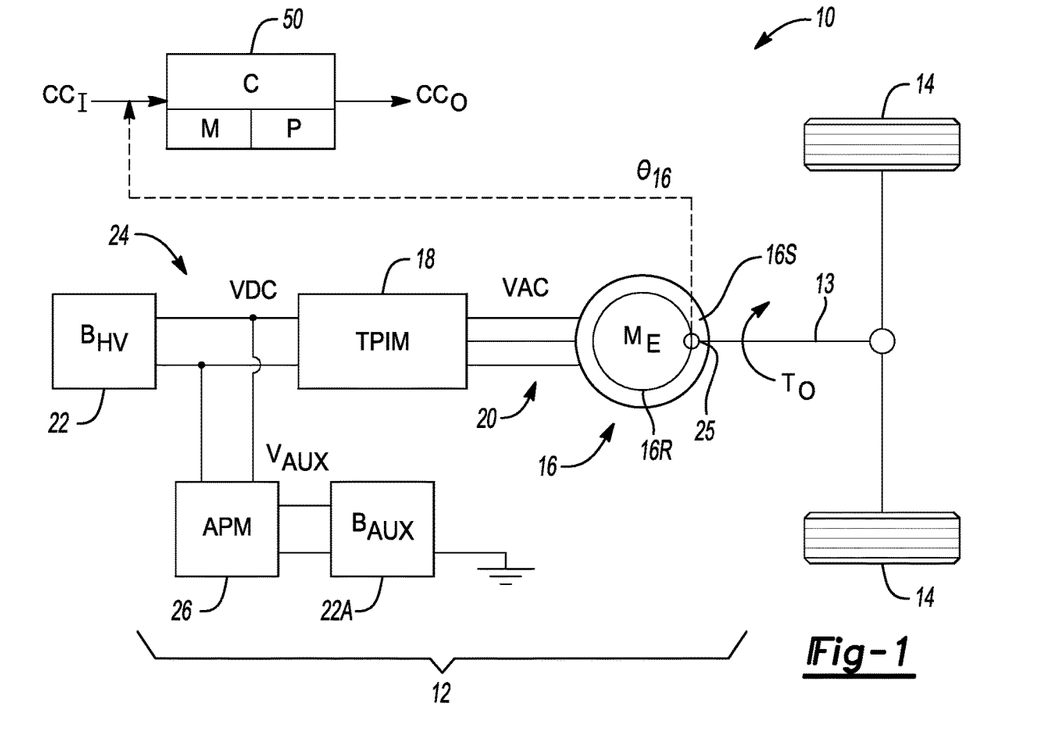
FIG. 1 is a schematic illustration of an exemplary mobile platform having a rotary electric machine and a position sensor assembly constructed and aligned as described herein.

Referring to the drawings, wherein like reference numbers refer to the same or like components in the several Figures, a mobile platform 10 is depicted in FIG. 1 having an electric powertrain 12. The mobile platform 10 may be optionally constructed as a motor vehicle, e.g., a hybrid or battery electric vehicle, tracked vehicle, motorcycle, or off-road/all-terrain vehicle. Alternatively, the electric powertrain 12 may be used as part of a drive system of a robot, power plant, hoist, or other mobile or stationary system. Additional exemplary vehicular applications of the electric powertrain 12 include tractors and other agricultural vehicles, as well as aircraft, watercraft, and rail vehicles. For illustrative consistency, however, the mobile platform 10 depicted in FIG. 1 will be described hereinafter in the context of a motor vehicle without limiting the present teachings to such an embodiment.

Figure 2:
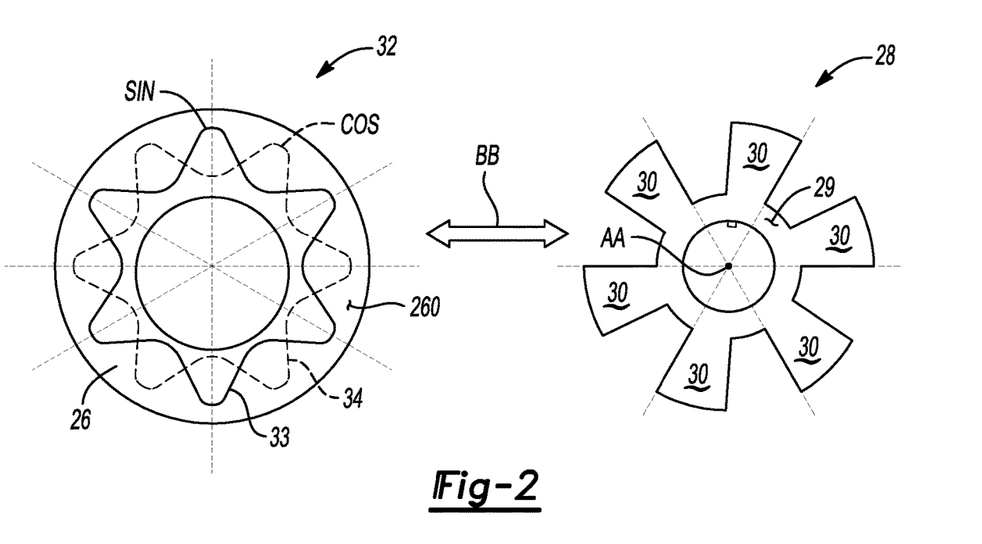
FIG. 2 is a schematic illustration of a sensor stator and sensor rotor of an inductive sensor assembly for use with the rotary electric machine of FIG. 1.
Figures 3, 4:
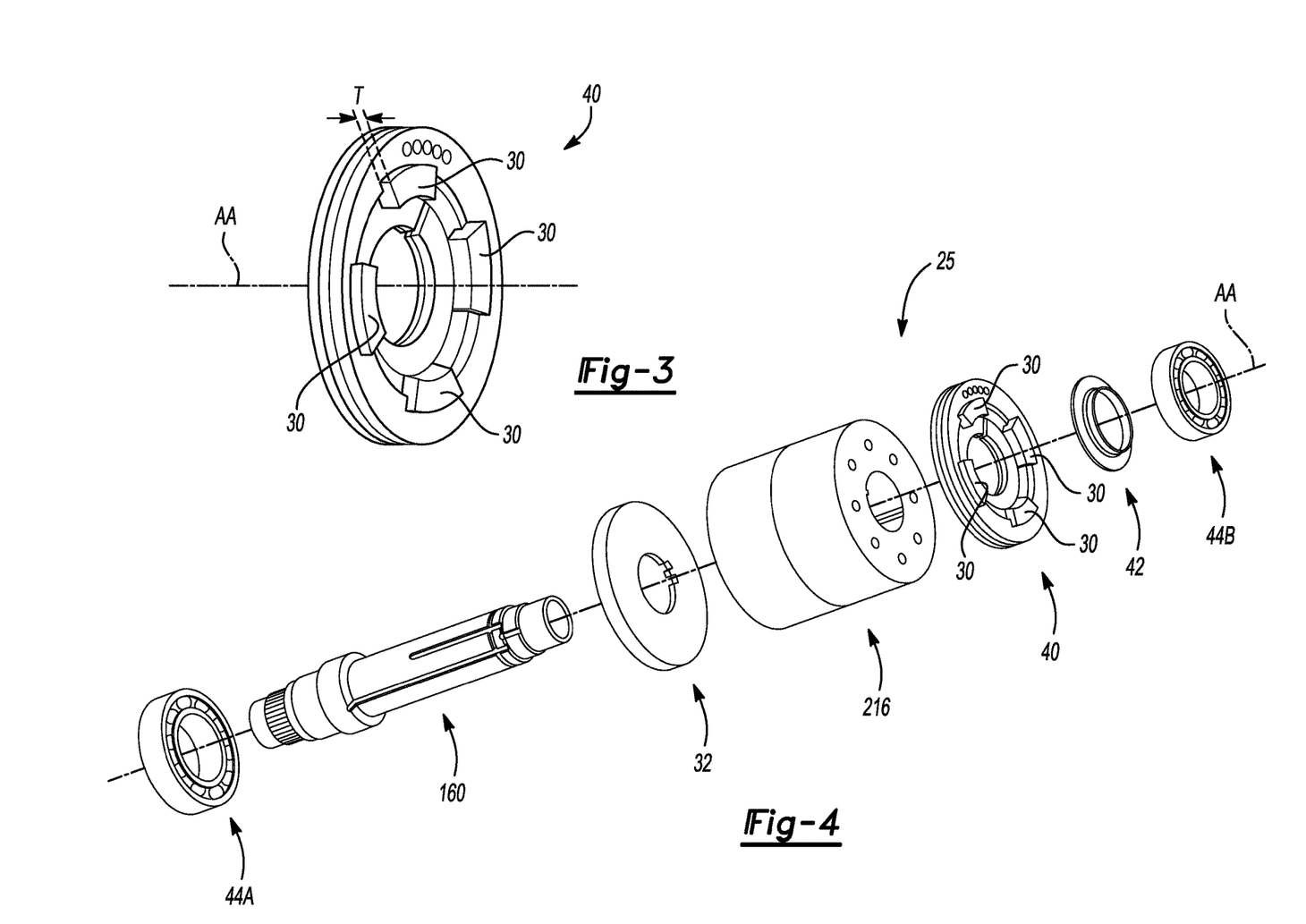
FIG. 3 is perspective view illustration of an annular end cap having integral lobes that is usable as part of the inductive position sensor assembly described herein.
FIG. 4 is an exploded schematic perspective view illustration of an inductive position sensor assembly having the annular end cap depicted in FIG. 3.

In the representative vehicular embodiment of FIG. 1, the mobile platform 10 includes one or more road wheels 14 in rolling contact with a road surface (not shown). The electric powertrain 12 in such a configuration may include at least one rotary electric machine ($M_E$) 16 operable as an electric traction motor and having a machine rotor 16R and a machine stator 16S. In a possible radial flux configuration, the machine stator 16S circumscribes the machine rotor 16R and is coaxially aligned therewith. Unmodulated rotary position signals (arrow $\theta_{16}$) in the form of pure sine and cosine signals are measured and output by a position sensor assembly 25 connected to the machine rotor 16R. An embodiment of the present sensor assembly 25 is depicted in FIGS. 2-4, with the sensor assembly 25 described herein purposefully aligned with the machine stator 16S and the machine rotor 16R in accordance with FIGS. 5 and 6, respectively, as set forth below.

Further with respect to the representative electric powertrain 12 of FIG. 1, the electric machine 16 may be embodied as a polyphase/alternating current (AC) traction motor. In such an embodiment, the machine stator 16S is connected to a traction power inverter module (TPIM) 18 via an AC voltage bus 20, or the TPIM 18 may be mounted directly onto the electric machine 16. The TPIM 18 in turn is electrically connected to a high-voltage battery pack ($B_{HV}$) 22 via a direct current (DC) voltage bus 24. The electric machine 16 is selectively energized by the battery pack 22 via the intervening TPIM 18 and a controller (C) 50 to generate motor output torque (arrow $T_O$) on an output member 13 coupled to the machine rotor 16R to rotate in conjunction therewith. The output torque (arrow $T_O$) in the illustrated embodiment is thereafter delivered to one or more of the road wheels 14 to propel the mobile platform 10. Although omitted from FIG. 1 for illustrative simplicity, the output member 13 may power an input member of a transmission or gear box, or the output member 13 may power the road wheels 14 directly, without limitation.

The battery pack 22 may be optionally embodied as a multi-cell high-energy energy storage device constructed from a lithium ion, zinc-air, nickel-metal hydride, or other application-suitable battery chemistry. A DC voltage (VDC) present on the DC voltage bus 24 at an application-suitable level, e.g., 60V-400V or more, is inverted to produce an AC waveform by switching control of semiconductor switches (not shown) residing within the TPIM 18, as will be appreciated by those of ordinary skill in the art. As a result of such high-speed switching control, an AC voltage (VAC) is provided on the AC voltage bus 20. Some embodiments of the electric powertrain 12 may also include an auxiliary power module (APM) 26 connected to the DC voltage bus 24 and to an auxiliary battery ($B_{AUX}$) 22A. The APM 26 may be configured as a DC-DC voltage converter that is configured and controlled to reduce the voltage level present on the DC voltage bus 24 to auxiliary voltage levels ($V_{AUX}$), e.g., 12-15V in a typical motor vehicle embodiment of the mobile platform 10.

The controller 50 of FIG. 1 is programmed in software and configured via sufficient hardware to regulate ongoing torque and speed operations of the electric machine 16. To that end, the controller 50 is equipped with a processor (P) and sufficient memory (M), including tangible non-transitory memory such as read only memory, e.g., optical, magnetic, and/or flash memory. The controller 50 also includes application-sufficient amounts of random-access memory, electrically-erasable programmable read only memory, and the like, as well as a high-speed clock, analog-to-digital and digital-to-analog circuitry, input/output circuitry and devices, and appropriate signal conditioning and buffer circuitry.

Motor control routines are executed by the controller 50 in response to receipt by the controller 50 of input signals (arrow CO from various sensors and/or networked control modules, inclusive of the above-noted unmodulated rotary position signals, $\theta_{16}$, as measured and output by the position sensor assembly 25. The input signals (arrow $CC_I$) may additionally include other motor control parameters, for instance temperature and direct-axis (d-axis) and quadrature-axis (q-axis) commands, as will be appreciated by those of ordinary skill in the art. The controller 50 ultimately generates output signals (arrow $CC_O$) that are used to control operation of the electric machine 16, e.g., the torque and/or speed thereof.

Referring briefly to FIG. 2, a sensor rotor 28 and a sensor stator 32 of the inductive position sensor assembly 25 of FIGS. 1, 3, and 4 are depicted schematically in plan view to illustrate the general operation of the position sensor assembly 25. In an actual embodiment of the position sensor assembly 25, the sensor rotor 28 and the sensor stator 32 would directly overlap as indicated by arrow BB, one on top of the other, such that the sensor rotor 28 and the sensor stator 32 are coaxially-aligned along a common axis of rotation AA of the machine rotor 16R shown in FIG. 1. In contrast to resolvers that rely on the reluctance principle and excitation in the 4-10 kHz range to produce a modulated sine/cosine data pair, as stated above, an inductive sensor instead uses higher-frequency excitation of about 4 MHz and relies on the eddy current principle to produce the unmodulated rotary position signals (arrow $\theta_{16}$) shown in FIG. 1.

In an exemplary configuration, the sensor rotor 28 may be constructed of a solid conductive material, for instance steel, copper, or aluminum, or another material having at least an application-sufficient minimum level of conductivity. The sensor rotor 28, which may be integrated with structure of the machine rotor 16R as described below with reference to FIGS. 3 and 4, includes multiple equally-spaced rotor lobes 30. Each rotor lobe 30 is connected to or formed integrally with an annular rotor hub 29, with the rotor lobes 30 projecting radially from an annular rotor hub 29. The number of rotor lobes 30 matches the number of magnetic pole pairs of the machine rotor 16R, with the number of lobes 30 depicted in FIG. 2 being representative of the present teachings and not limiting.

In an inductive embodiment of the position sensor assembly 25, the sensor assembly 25 includes a printed circuit board or PCB 26 having a major surface 260 etched with conductive traces 33 and 34, e.g., thin copper traces. The traces 33 and 34 form respective sine (SIN) and cosine (COS) signal traces of the sensor stator 32. Although omitted for added simplicity, the sensor stator 32 and/or the controller 50 also includes an application-specific integrated circuit (ASIC) and/or suitable control logic for generating sensor excitation signals, and for processing the unmodulated rotary position signals (arrow $\theta_{16}$) during the ongoing rotation of the sensor rotor 28 with respect to the traces 33 and 34. The unmodulated rotary position signals (arrow $\theta_{16}$) of FIG. 1 are thus indicative of the instantaneous angular position of the machine rotor 16R.

Referring to FIGS. 3 and 4, as part of the present approach, the rotor lobes 30 shown schematically in FIG. 2 may be integrated into the structure of the machine rotor 16R. For instance, an annular end cap 40 may be positioned adjacent to a cylindrical rotor stack 216 of the machine rotor 16R, with the rotor stack 216 being constructed from an application-suitable number of thin steel laminations as will be appreciated by those of ordinary skill in the art. The end cap 40, which may be constructed from non-magnetic materials, defines the above-described lobes 30 in some embodiments, with the total number of such lobes 30 equaling the number of magnetic pole pairs of the machine rotor 16R. A simplified non-limiting 8-pole embodiment of the machine rotor 16R is depicted in FIGS. 3 and 4 in which the annular end cap 40 is integrally formed with four of the lobes 30. In a possible embodiment, each of the lobes 30 may have a thickness (T) along the axis of rotation AA of at least about 0.5 mm, e.g., at least 3-5 mm in some embodiments, and thus the lobes 30 present a low profile in an axial side view. Additionally, the lobes 30 having such a thickness would be thick enough that an eddy current will result on a surface of the lobe 30 but not so thick as to add an undesirable amount of weight and mass.

FIG. 4 is an exploded view illustration of an exemplary embodiment of the position sensor assembly 25 of FIG. 3, inclusive of the above-described end cap 40. The position sensor assembly 25, the machine rotor 16R, and the sensor stator 32 are coaxially aligned along the axis of rotation AA. A rotor shaft 160 of the machine rotor 16R is likewise arranged along the axis of rotation AA, with the end cap 40 and a machine rotor 16R being keyed to the rotor shaft 160 to rotate in conjunction therewith whenever the rotary electric machine 16 of FIG. 1 is energized by the TPIM 18 and battery pack 22. The entire position sensor assembly 25 may be rotatably supported by a set of oppositely-disposed bearings 44A and 44B, with an annular adapter ring 42 possibly used proximate the bearings 44B in some configurations to provide the requisite tolerance and fit. Integration of the lobes 30 into the end cap 40 shown in FIGS. 3 and 4 is intended to provide various advantages, including but not necessarily limited to reduced part count, increased sensor robustness, and simplified integration with the rotary electric machine 16.

In order for the above-described position sensor assembly 25 of FIG. 4 to be useable within the electric powertrain 12 of FIG. 1, the sensor assembly 25 is first properly aligned with the machine rotor 16R and the machine stator 16S. As used herein, such alignment may include aligning the sensor stator 32 with the magnetic axis of the machine stator 16S ("stator-stator alignment"), aligning the sensor rotor 28 with the d-axis of a south pole of machine rotor 16R ("rotor-rotor alignment"), and possibly aligning a rotor key 55 (see FIG. 6) with the rotor lobe 30. Such alignment enables the establishment of a calibrated reference angle for use by the controller 50 in establishing accurate ongoing control of the electric machine 16 of FIG. 1.

Proper alignment of the position sensor assembly 25 is used herein as part of an initial sensor calibration effort in order to establish a calibrated reference angle of the machine rotor 16R, with the calibrated reference angle thereafter used by the controller 50 of FIG. 1 to regulate a torque and/or speed operation of the electric machine 16. As will be appreciated, inclusion of the sensor assembly 25 as a constituent component of the machine rotor 16R of the electric machine 16 of FIG. 1, without also performing the disclosed alignment of FIGS. 5 and 6, will result in a random reference angle and, as a result, decreased accuracy. Absent the present teachings, the controller 50 would thus require application of an offset learning routine to provide a semblance of control accuracy. The present methodology for aligning the position sensor assembly 25 with the electric machine 16 is therefore intended to eliminate the need for such offset learning, simplify overall calibration efforts, and improve control accuracy.

Figure 5:
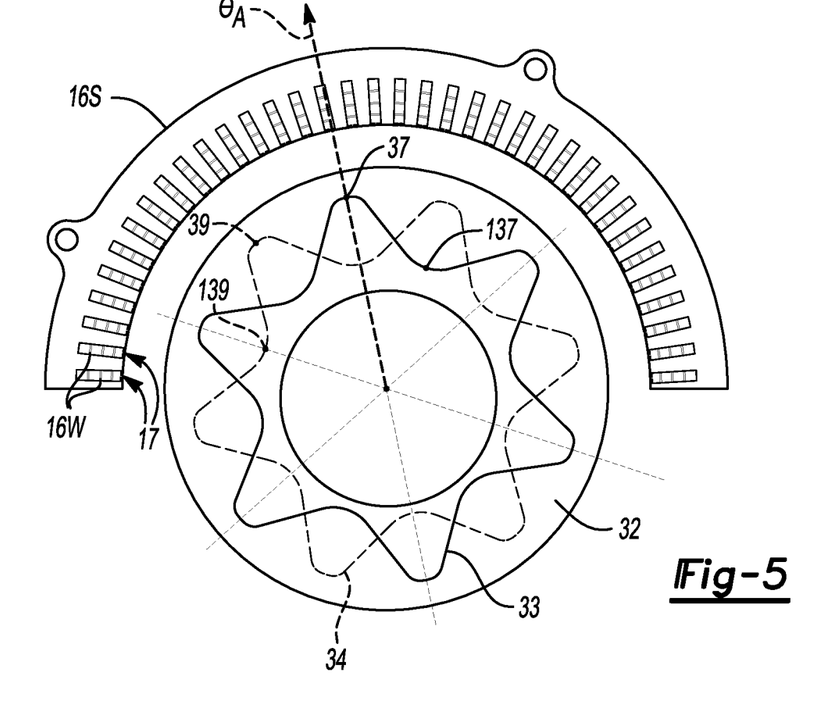
FIG. 5 is a schematic plan view illustration of a portion of a machine stator and a sensor stator depicting stator-stator alignment.

With respect to FIG. 5, the sensor stator 32 is shown as it would appear when properly aligned with the axis of rotation AA, and when surrounded or circumscribed by the machine stator 16S. While the machine stator 16S forms a cylinder that completely surrounds the sensor stator 32 and the axis of rotation AA, for illustrative simplicity a radially-upper half of the machine stator 16S is depicted, with stator windings 16W disposed or wound within stator slots 17. As explained above with reference to FIG. 2, the sensor stator 32 includes respective sine and cosine traces 33 and 34, along with an ASIC (not shown) for generating a suitable excitation signal. The traces 33 and 34 follow a predetermined pattern, with the number of cycles matching the number of pole pairs of the rotary electric machine 16, as noted above. As will be appreciated, the sine and cosine traces 33 and 34 have respective peaks 37 and 39 and valleys 137 and 139. Using the present approach, one of the peaks 37 of the sine traces 33 is aligned with and bisects the magnetic axis of a predetermined electrical phase of the machine stator 16S, e.g., phase A ($\phi_A$) of in a three-phase embodiment of the electric machine 16 using nominal A, B, and C phases.

Figure 6:
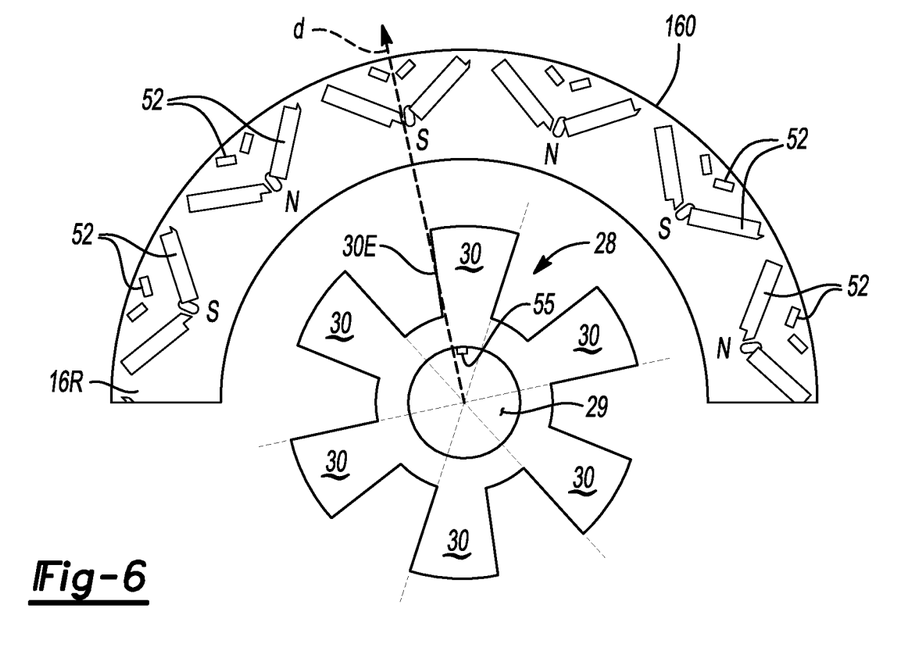
FIG. 6 is a schematic plan view illustration of a portion of a machine rotor and a sensor rotor depicting rotor-rotor alignment.

FIG. 6 depicts the machine rotor 16R of the electric machine 16. As with the machine stator 16S of FIG. 5, the upper half of the machine rotor 16R is depicted for illustrative simplicity. When the rotary electric machine 16 is embodied as permanent magnet synchronous motor (PMSM), sets of interior rotor magnets 52 are equally spaced around the circumference of the machine rotor 16R, e.g., in the illustrated V-configuration in which the V-angles of the magnets 52 open toward an outer diameter surface 160 of the machine rotor 16R. Sets of such rotor magnets 52 are arranged to form alternating north-south rotor poles, with north and south poles respectively abbreviated N and S for clarity.

To align the sensor rotor 28 with the machine rotor 16R, an edge 30E of one of the lobes 30, and possibly of a rotor key 55, are aligned with the d-axis of a south pole of the machine rotor 16R. That is, the d-axis and edge 30E are coaxial and directly overlap one another. As best shown in FIG. 3, the lobes 30 of the sensor rotor 28 may be integrated into the machine rotor 16R, e.g., into the end cap 40, and therefore the illustrated sensor rotor 28 of FIG. 6 uses the schematic depiction of FIG. 2 to illustrate the present teachings.

In view of the foregoing disclosure, a method is enabled for assembling the position sensor assembly 25 for the rotary electric machine 16 of FIG. 1. A possible implementation includes providing the sensor stator 32 having the PCB 29 of FIG. 5 with the electrically conductive sine and cosine traces 33 and 34 formed on a major surface 26 thereof, and providing the annular end cap 40 of FIG. 3, i.e., having a plurality of lobes 30 equal in number to a number of pole pairs of the machine rotor 16R. The method may include connecting the sensor stator 32 to the machine stator 16S with a predetermined stator-stator alignment, as well as connecting the annular end cap 40 to the machine rotor 16R with a predetermined rotor-rotor alignment. In response to rotation of the machine rotor 16R and a resulting rotation of the lobes 30 with respect to the sine and cosine traces 33 and 34, the method includes generating and outputting an unmodulated sine/cosine data pair to the controller 50, with such a data pair indicated by arrow $\theta_{16}$ in FIG. 1.

Connecting the sensor stator 32 to the machine stator 16S with the above-noted predetermined stator-stator alignment may include aligning a magnetic axis of a predetermined electrical phase of the machine 16 with a peak 37 of the sine trace 33, as shown in FIG. 5. Connecting the annular end cap 40 to the machine rotor 16R with the predetermined rotor-rotor alignment may include aligning the d-axis of the machine rotor 16R with an edge 30E of one of the lobes 30 as shown in FIG. 6. While integration of the lobes 30 into the machine rotor 16R provide certain performance advantages as noted above, embodiments in which the lobes 30 are not integrated with the machine rotor 16R are also possible. In such embodiments, the predetermined rotor-rotor alignment may entail aligning the d-axis with an edge of the rotor key 55 illustrated in FIG. 6.

In response to receipt of the unmodulated sine/cosine data pair by the controller 50, the method includes establishing a calibrated reference angle of the machine rotor 16R using the unmodulated rotary position signals (arrow $\theta_{16}$) from the sensor assembly 25, and thereafter controlling an operation of the electric machine 16 using the calibrated reference angle. As noted above, the method may include connecting the machine rotor 16R to a driven load, e.g., one or more of the road wheels 14 shown in FIG. 1, and then powering the driven load using output torque (arrow $T_O$) from the electric machine 16. When the sensor assembly 25 is constructed as set forth above, the sine signal output from the sensor assembly 25 will align with the back-electromotive force/back-EMF of a particular electrical phase, e.g., phase A, to provide a calibrated reference for use by the controller 50.

While some of the best modes and other embodiments have been described in detail, various alternative designs and embodiments exist for practicing the present teachings defined in the appended claims. Those skilled in the art will recognize that modifications may be made to the disclosed embodiments without departing from the scope of the present disclosure. Moreover, the present concepts expressly include combinations and sub-combinations of the described elements and features. The detailed description and the drawings are supportive and descriptive of the present teachings, with the scope of the present teachings defined solely by the claims.

What is claimed is:

1. A rotary electric machine comprising:
a machine stator;
a machine rotor circumscribed by the machine stator and having a rotor shaft, a rotor stack, and an annular end cap collectively configured to rotate about an axis of rotation, wherein the end cap includes a plurality of lobes equal in number to a number of magnetic pole pairs of the machine rotor; and
a position sensor assembly having a predetermined alignment with the machine rotor and a predetermined alignment with the machine stator, the sensor assembly including:
a sensor rotor formed by the plurality of lobes; and a sensor stator having a printed circuit board with a major surface, and with electrically conductive sine and cosine traces formed on the major surface;
wherein the sensor assembly is configured, in response to rotation of the machine rotor and a resulting rotation of the lobes with respect to the sine and cosine traces, to generate and output unmodulated sine and cosine signals to a controller, and wherein the predetermined alignment with the machine rotor and the predetermined alignment with the machine stator together align the unmodulated sine signal with a back-electromotive force of a predetermined electrical phase of the machine stator.

2. The rotary electric machine of claim 1, wherein the machine rotor includes permanent magnets arranged in alternating north pole and south pole orientations around a perimeter of the machine rotor, and wherein the electric machine is a permanent magnet synchronous motor.

3. The rotary electric machine of claim 1, wherein the lobes are constructed of copper, aluminum, or steel.

4. The rotary electric machine of claim 3, wherein each of the lobes has an axial thickness of at least 0.5 mm.

5. The rotary electric machine of claim 1, wherein the rotary electric machine is a polyphase/alternating current-powered electric traction motor and the sine and cosine traces have respective peaks and valleys, and wherein, in the predetermined alignment with the machine stator, a magnetic axis of a predetermined electrical phase of the electric traction motor is aligned with and bisects a peak of the sine trace.

6. The rotary electric machine of claim 5, wherein in the predetermined alignment with the machine rotor, a direct axis (d-axis) of the machine rotor is coaxially aligned with an edge of one of the lobes.

7. The rotary electric machine of claim 1, wherein the position sensor assembly is an inductive position sensor assembly.

8. An electric powertrain comprising:
a controller;
a battery pack;
a traction power inverter module (TPIM) connected to the battery pack;
a polyphase/alternating current rotary electric machine that is electrically connected to the TPIM, the electric machine comprising:
a machine stator;
a machine rotor connected to a driven load, circumscribed by the machine stator, and having a rotor shaft, a rotor stack, and an annular end cap that are collectively configured to rotate about an axis of rotation, wherein the end cap includes a plurality of lobes that are equal in number to a number of magnetic pole pairs of the machine rotor; and
an inductive position sensor assembly having a predetermined alignment with the machine rotor and a predetermined alignment with the machine stator, the sensor assembly including:
a sensor rotor formed by the lobes; and
a sensor stator having a printed circuit board with a major surface, and electrically conductive sine and cosine traces formed on the major surface, wherein the sensor stator is in communication with the controller;
wherein the sensor assembly is configured, in response to rotation of the machine rotor and resulting rotation of the lobes with respect to the sine and cosine traces, to generate and output unmodulated sine and cosine signals, the predetermined alignment with the machine rotor and the predetermined alignment with the machine stator together align the unmodulated sine signal with a back-electromotive force of a predetermined electrical phase of the machine stator, and wherein the controller is configured to establish a calibrated reference angle of the machine rotor using the unmodulated sine and cosine signals and thereafter control an operation of the electric machine using the calibrated reference angle.

9. The electric powertrain of claim 8, wherein the machine rotor includes a plurality of permanent magnets arranged in alternating north pole and south pole orientations around a perimeter of the machine rotor, and wherein the electric machine is a permanent magnet synchronous motor.

10. The electric powertrain of claim 8, wherein the lobes are constructed of copper, aluminum, or steel, and have an axial thickness of at least 0.5 mm.

11. The electric powertrain of claim 8, wherein the rotary electric machine is a polyphase/alternating current-powered electric traction motor and the sine and cosine traces have respective peaks and valleys, and wherein in the predetermined alignment with the machine stator, a magnetic axis of the predetermined electrical phase of the electric traction motor is aligned with and bisects a peak of the sine trace.

12. The electric powertrain of claim 11, wherein in the predetermined alignment with the machine rotor, a direct axis (d-axis) of the machine rotor is coaxially aligned with an edge of one of the lobes.

13. The electric powertrain of claim 11, wherein the machine rotor is connected to a load, and the operation of the electric machine includes controlling an amount of output torque delivered to the load by the electric machine.

14. The electric powertrain of claim 13, wherein the load is a set of road wheels of a motor vehicle.

15. A method for assembling an inductive position sensor assembly for a rotary electric machine having a machine rotor circumscribed by a machine stator, the machine rotor having a rotor shaft, a rotor stack, and an annular end cap that are collectively configured to rotate about an axis of rotation, the method comprising:
providing a sensor stator having a printed circuit board (PCB) with electrically conductive sine and cosine traces formed on a major surface of the PCB;
providing an annular end cap having a plurality of lobes equal in number to a number of magnetic pole pairs of the machine rotor;
connecting the sensor stator to the machine stator with a predetermined stator-stator alignment;
connecting the annular end cap to the machine rotor with a predetermined rotor-rotor alignment; and
in response to rotation of the machine rotor and a resulting rotation of the lobes with respect to the sine and cosine traces, generating and outputting an unmodulated sine and cosine signals to a controller, wherein the predetermined stator-stator alignment and the predetermined rotor-rotor alignment together align the unmodulated sine signal with a back-electromotive force of a predetermined electrical phase of the machine stator.

16. The method of claim 15, wherein the machine rotor includes a plurality of permanent magnets arranged in alternating north pole and south pole orientations around a perimeter of the machine rotor, and wherein the electric machine is a permanent magnet synchronous motor.

17. The method of claim 16, wherein the rotary electric machine is a polyphase alternating current-powered electric traction motor and the sine and cosine traces have respective peaks and valleys, and wherein connecting the sensor stator to the machine stator with a predetermined stator-stator alignment includes aligning a magnetic axis of the predetermined electrical phase with a peak of the sine trace, and wherein connecting the annular end cap to the machine rotor with a predetermined rotor-rotor alignment includes aligning a direct axis (d-axis) of the machine rotor with an edge of one of the lobes.

18. The method of claim 17, further comprising:
in response to receipt of the unmodulated sine and cosine signals by the controller, establishing a calibrated reference angle of the machine rotor using the unmodulated sine/cosine data pair; and
controlling a torque and/or speed operation of the electric machine using the calibrated reference angle.

19. The method of claim 18, further comprising:
connecting the machine rotor to a load; and
powering the load using output torque from the electric machine.

20. The method of claim 19, wherein powering the load includes powering one or more road wheels of a motor vehicle.

\* \* \* \* \*